US008098812B2

(12) United States Patent
Fadili et al.

(10) Patent No.: US 8,098,812 B2
(45) Date of Patent: Jan. 17, 2012

(54) METHOD OF CONTROLLING AN ADAPTATION OF A FILTER

(75) Inventors: Moulay Fadili, Franconville (FR); Sutharshini Illango, Paris (FR); Abdelkrim Moulehiawy, Paris (FR)

(73) Assignee: Alcatel Lucent, Paris (FR)

( * ) Notice: Subject to any disclaimer, the term of this patent is extended or adjusted under 35 U.S.C. 154(b) by 1426 days.

(21) Appl. No.: 11/637,051

(22) Filed: Dec. 12, 2006

(65) Prior Publication Data
US 2007/0206777 A1    Sep. 6, 2007

(30) Foreign Application Priority Data
Feb. 22, 2006    (EP) .................................. 062903109

(51) Int. Cl.
*H04M 9/00* (2006.01)
(52) U.S. Cl. ............................. 379/390.02; 379/406.08
(58) Field of Classification Search .......... 379/406.01–406.16, 309.02
See application file for complete search history.

(56) References Cited

U.S. PATENT DOCUMENTS

| 4,903,247 A * | 2/1990 | Van Gerwen et al. ........ 367/135 |
| 5,483,594 A | 1/1996 | Prado et al. | |
| 6,256,384 B1 * | 7/2001 | Trump ..................... 379/406.08 |
| 7,333,605 B1 * | 2/2008 | Zhang et al. ............. 379/406.08 |
| 7,386,120 B2 * | 6/2008 | Rayala ..................... 379/406.01 |
| 2003/0076844 A1 * | 4/2003 | Usman et al. ................. 370/401 |
| 2003/0108192 A1 * | 6/2003 | Tanrikulu et al. ........ 379/406.08 |
| 2003/0202654 A1 * | 10/2003 | Xiong ..................... 379/406.01 |
| 2006/0034447 A1 * | 2/2006 | Alves et al. ............. 379/406.01 |
| 2006/0036432 A1 * | 2/2006 | Kjorling et al. ............... 704/206 |
| 2007/0121925 A1 * | 5/2007 | Cruz-Zeno et al. ...... 379/406.01 |

FOREIGN PATENT DOCUMENTS
EP    0 878 920 A    11/1998
* cited by examiner

*Primary Examiner* — Fan Tsang
*Assistant Examiner* — Akelaw Teshale
(74) *Attorney, Agent, or Firm* — Harness, Dickey & Pierce

(57) ABSTRACT

The invention concerns a method of controlling an adaptation of a filter, and a controller and a computer program product to execute this method. The filter is an adaptive finite impulse response (=FIR) filter for modelling an echo path impulse response for echo cancellation in a telecommunications connection between a first terminal providing a near-end signal at a first end of the telecommunications connection and a second terminal providing a far-end signal at another end of the telecommunications connection. In a multi-windowing scheme, a plurality of filter segments and segments of the far-end signal is determined in the time domain. An energy level associated to an individual segment of the far-end signal is compared with an energy level associated to a sample of the near-end signal. In dependence on the result of the comparison of the energy levels, the adaptation of an individual filter segment associated to the individual segment of the far-end signal is enabled or inhibited.

10 Claims, 4 Drawing Sheets

METHOD OF CONTROLLING AN ADAPTATION OF A FILTER

The invention is based on a priority application EP 06 290 310.9 which is hereby incorporated by reference.

TECHNICAL FIELD

The present invention relates to a method of controlling an adaptation of a filter, in particular an adaptive finite impulse response filter for modelling an echo path impulse response for echo cancellation in a telephone connection, and a controller and a computer program product to execute said method.

BACKGROUND OF THE INVENTION

Echo significantly degrades the sound quality of telephony voice communications. In telephony voice communications between two parties, i.e., a far-end speaker and a near-end speaker, the far-end speaker perceives echo effects if his voice signals are transmitted back to him. Two types of echoes can be differentiated, according to the place where they are created: acoustic echo, due to a coupling between the loudspeaker and the microphone on the near-end side (e.g., with a handsfree telephone set such as in a car), and electric—or line—echo, due to a line impedances mismatch during the 2-to-4 wire conversion at the switching station. Therefore, echo cancellation is important to preserve a good communication quality. Furthermore, with the development of VoIP telephony, which increases end-to-end transmission delays, echo cancellation becomes mandatory (VoIP=Voice over Internet Protocol).

The task of an echo canceller is to mimic the echo signal, thus providing an estimate of the echo signal, and remove this estimate from the signal combining near-end signals and echo of the far-end signals, yielding a residual signal ideally consisting of only the near-end speaker signal. The estimated echo signal is also known as echo path estimate. For the modelling of the echo signal, most commonly an adaptive finite impulse response (=FIR) filter is used.

However, the performance of the echo canceller drastically deteriorates during double-talk periods in which signals from both the near-end and far-end speakers coexist. As the large component of the near-end speech distorts the output signal, the filter coefficients determined by the echo canceller deviate from their converged state. Consequently, the error between the real echo signal and its replica generated by the filter increases. The major target of a double-talk detection (=DTD) module is to detect phases when the far-end speaker and the near-end speaker are talking at the same time and suspend the echo estimation during these phases in order to prevent a filter divergence.

The existing solutions for DTD can be classified into three groups. First, energy-based algorithms, such as Geigel DTD or robust Geigel DTD, which require few MIPS but are not very efficient (MIPS=Million Instructions per Second). Second, correlation-based algorithms such as the cross-correlation or the coherence methods which are quite efficient provided the echo-to-noise ratio is high, but these methods require extensive memory storage and involve a high computational complexity. Third, methods based on the echo path estimate filter evolution control have a higher performance than the Geigel DTD method but are nearly as computationally complex as correlation-based methods.

Currently, there is no solution that provides a good trade-off between efficiency and complexity. Moreover, the present solutions do not provide for the case of a detection miss, i.e., an actual double-talk situation not detected by the algorithm. Thus, adaptation will needlessly be allowed for the whole filter length and therefore leads to divergence of the entire filter.

SUMMARY OF THE INVENTION

It is the object of the present invention to provide an improved DTD solution.

The object of the present invention is achieved by a method of controlling an adaptation of a filter, wherein the filter is an adaptive FIR filter for modelling an echo path impulse response for echo cancellation in a telecommunications connection between a first terminal providing a near-end signal at a first end of the telecommunications connection and a second terminal providing a far-end signal at another end of the telecommunications connection, wherein the method comprises the steps of determining, in a multi-windowing scheme, a plurality of filter segments and segments of the far-end signal in the time domain, comparing an energy level associated to an individual segment of the far-end signal with an energy level associated to a sample of the near-end signal, and enabling the adaptation of an individual filter segment associated to the individual segment of the far-end signal in dependence on the result of the comparison of the energy levels. The object of the present invention is further achieved by a controller for controlling an adaptation of a filter, wherein the filter is an adaptive FIR filter for modelling an echo path impulse response for echo cancellation in a telecommunications connection between a first terminal providing a near-end signal at a first end of the telecommunications connection and a second terminal providing a far-end signal at another end of the telecommunications connection, wherein the controller is adapted to determine, in a multi-windowing scheme, a plurality of filter segments and segments of the far-end signal in the time domain, compare an energy level associated to an individual segment of the far-end signal with an energy level associated to a sample of the near-end signal, and enable the adaptation of an individual filter segment associated to the individual segment of the far-end signal in dependence on the result of the comparison of the energy levels. And the object of the present invention is further achieved by a computer program product for controlling an adaptation of a filter, wherein the filter is an adaptive FIR filter for modelling an echo path impulse response for echo cancellation in a telecommunications connection between a first terminal providing a near-end signal at a first end of the telecommunications connection and a second terminal providing a far-end signal at another end of the telecommunications connection, wherein the computer program product, when executed by a controller, performs the steps of determining, in a multi-windowing scheme, a plurality of filter segments and segments of the far-end signal in the time domain, comparing an energy level associated to an individual segment of the far-end signal with an energy level associated to a sample of the near-end signal, and enabling the adaptation of an individual filter segment associated to the individual segment of the far-end signal in dependence on the result of the comparison of the energy levels.

With this method, during single-talk phases, the probability for the segments of the filter operating on the main (or principal) echo to be adapted is very high. For the other segments of the filter, even if adaptation is not often enabled—for instance if the far-end energy level in the considered frames is low—it is not a critical issue since they do not contain any useful information. Therefore, this filter segment processing guarantees high convergence rate.

By segmenting the filter into subfilters, the risk of unwanted adaptation of the filter is minimised. During double-talk phases, when a detection error occurs, i.e., a double-talk situation is not detected, the fact that each segment of the filter is processed totally independently limits the divergence spread: not all the filter segments will simultaneously diverge, but only those which do not fulfil the energy difference condition.

Besides, the negligible computational complexity of this method enables its implementation in addition to the other existing solutions to increase the robustness of the double-talk detection.

A large number of DTD applications are based on the Geigel algorithm of which this invention is an enhancement. Therefore and because the global quality of an echo canceller depends a lot on its DTD performance, the present invention means an extensive and significant advancement in the field of echo cancellation.

Further advantages are achieved by the embodiments of the invention indicated by the dependent claims.

According to a preferred embodiment of the invention, the filter segments are created from a representation of the filter in the time-domain, i.e., characteristics of the filter plotted against time. The representation of the filter in the time-domain is divided into N filter segments, wherein N>1. Likewise, the segments of the far-end signal are created from a representation of the far-end signal in the time-domain. N samples of the far-end signal are extracted wherein each of the N samples of the far-end signal corresponds to one of the N filter segments. From each of the N samples of the far-end signal a corresponding energy level is determined. A current sample of the near-end signal, which is to be corrected for unwished echo, is taken in the time domain and a corresponding energy level is determined. Then, for each of the N segments of the far-end signal, an energy level of the i-th segment of the far-end signal is compared with a corresponding energy level of the near-end signal, wherein 1<=i<=N. Based on the result of this comparison of the energy levels, the adaptation of the corresponding i-th filter segment is enabled or inhibited.

According to another preferred embodiment of the invention, the far-end signal and the near-end signal are plotted with a comparable representation of their energy against time, and from these representations the corresponding energy levels of the far-end signal and the near-end signal are determined. Then, the ratio of the energy level of an i-th segment of the far-end signal and the corresponding energy level of the current sample of the near-end signal is calculated. The calculated ratio is used for comparison of said energy levels. This comparison comprises the comparison of said ratio with a pre-defined threshold value. Based on the comparison, the adaptation of the i-th filter segment corresponding to the i-th segment of the far-end signal is decided on. If the ratio is higher than the threshold value, the adaptation of the corresponding i-th filter segment is allowed. However, if the ratio is lower than or equal to the threshold value, this is taken as an indication that double-talk exists, and the adaptation of the corresponding i-th filter segment is not allowed.

According to another preferred embodiment of the invention, the threshold value used for comparison of said energy levels is defined on the basis of an hypothesis of a minimum echo path attenuation. In a given telephony connection, the echo path attenuation—also known as echo return loss (=ERL)—depends on the switched telephone network characteristics. 6 dB is specified in ITU-T G.168 recommendation as a typical worst-case value encountered for most networks. Therefore the minimum echo path attenuation of most echo cancellers is set to 6 dB, or sometimes 3 dB or 0 dB.

In a preferred embodiment, the N segments of the far-end signal are determined as N subsequent and equidistant segments of the far-end signal, i.e., comprising the current sample of the far-end signal and the N−1 past time-domain segments of the far-end signal adjacent to the current sample of the far-end signal. For each of these N segments of the far-end signal a corresponding filter segment is determined, wherein N>1.

According to another preferred embodiment of the invention, the segment size of each of the N segments of the far-end signal is chosen equal to the sample size of the near-end signal. Thus, the length of the far-end signal sample used in the method is N times the length of the near-end signal sample.

Preferably, the controller is adapted to operate in parallel to an existing DTD unit. The controller may be implemented into an existing DTD unit or installed in a separate place. The controller may be used to check the results of the DTD unit. In case the existing DTD unit does not decide on double-talk and the controller decides on double-talk, the controller overrules the decision of the existing DTD unit.

Preferably, the controller is adapted to receive data about the energy levels from existing double-talk detection units measuring said energy levels. Thus, the controller can utilise existing resources of a DTD unit.

BRIEF DESCRIPTION OF THE DRAWINGS

These as well as further features and advantages of the invention will be better appreciated by reading the following detailed description of presently preferred exemplary embodiments taken in conjunction with accompanying drawings of which.

To simplify the description, the example of an acoustic echo canceller (=AEC) has been taken in the following sections, but the present invention could be embedded in any type of echo canceller.

DETAILED DESCRIPTION OF PREFERRED EMBODIMENTS

Figure 1:
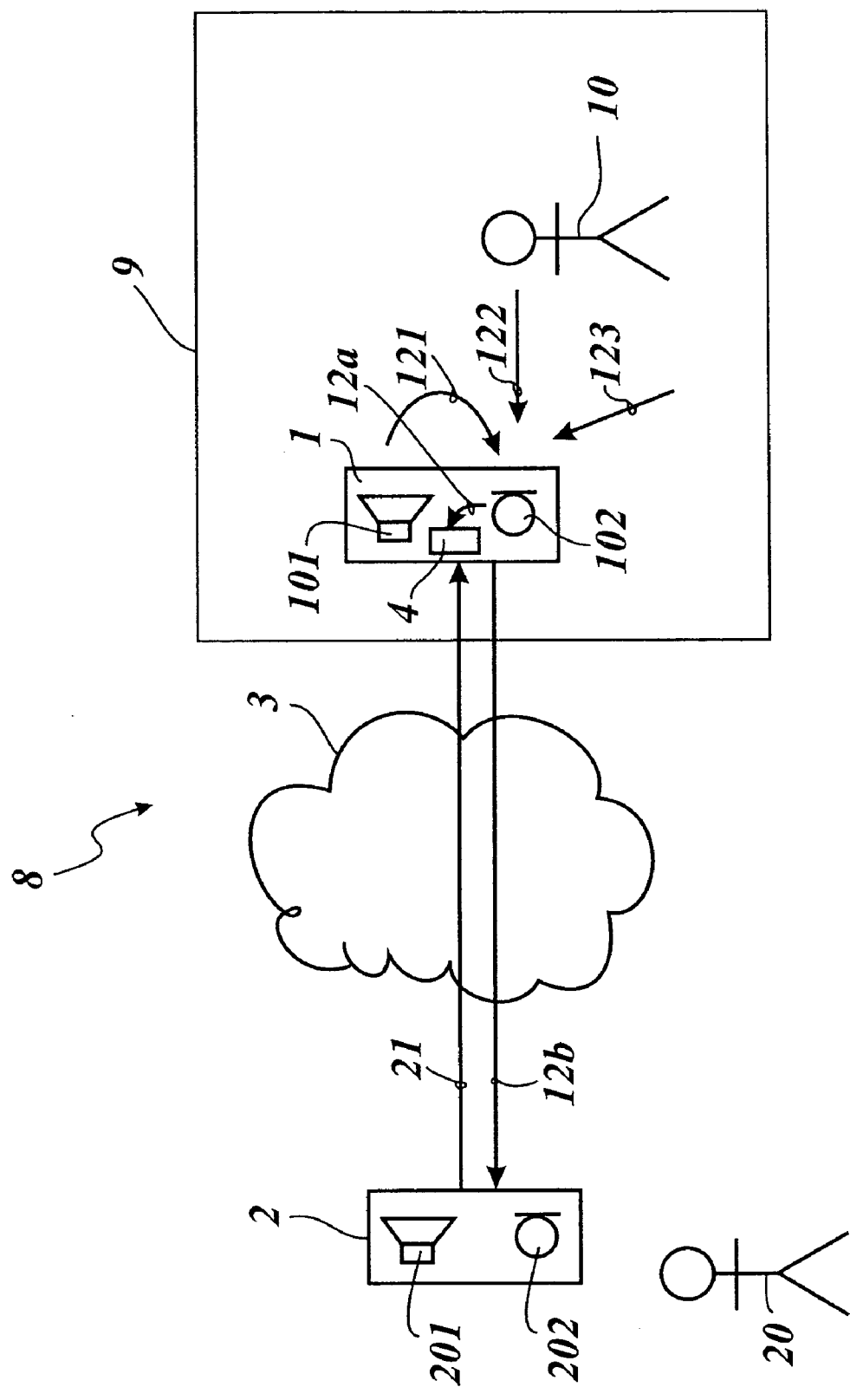
FIG. 1 is a block diagram of a telephone connection according to an embodiment of the invention.

FIG. 1 shows a telephone connection 8 between a first terminal 1 assigned to a first subscriber 10 and a second terminal 2 assigned to a second subscriber 20. The telephone connection 8 comprises the exchange of electric signals 12b, 21 across a telecommunications network 3. The telecommunications network 3 may consist of legacy telephone networks, e.g., of the PSTN type, and/or packet-switched telephone networks, e.g., VoIP networks (PSTN=Public Switched Telephone Network). The terminals 1, 2 may be legacy telephone sets and/or VoIP telephones.

The electric signal 21 originating from a microphone 202 of the second terminal 2 is transmitted via the telecommunications network 3 to a loudspeaker 101 of the first terminal 1. The electric signal 12b originating from a microphone 102 of the first terminal 1 is transmitted via the telecommunications network 3 to a loudspeaker 201 of the second terminal 2. The microphone 102 of the first terminal 1 receives acoustic voice signals 122 from the first subscriber 10, acoustic echo signals 121 from the loudspeaker 101, transmitted via the air and the housing of the first terminal 1, and acoustic and/or electric channel noise signals 123. The signals 121, 122, 123 received by the microphone 102 are converted into an electric signal 12a by the microphone 102 and processed by an AEC 4 before being transmitted as electric signal 12b to the second terminal 2. There, the electric signal 12b is re-converted in acoustic signals by means of the loudspeaker 201.

In analogy to the first terminal 1, the microphone 202 of the second terminal 2 also receives voice signals from the second subscriber 20, echo signals from the loudspeaker 201 and channel noise signals from the environment of the second terminal 2, which however are not shown in FIG. 1 to simplify the description. The signals received by the microphone are converted by the microphone to electric signals and transmitted as electric signals 21 via the telecommunications network 3 to the first terminal 1.

Although the second terminal 2 may also comprise an AEC, the description of the present invention will be limited—for simplicity reasons—to the AEC 4 comprised in the first terminal 1. As we concentrate on the AEC 4 in the first terminal 1, the electric signals 12a, 12b originating from the first terminal 1 will be referred to in the following as original near-end signal 12a and residual near-end signal 12b, respectively, whereas the electric signal 21 originating from the second terminal 2 will be referred to as far-end signal 21.

As an acoustic wave originating from the loudspeaker 101 propagates within the environment 9 surrounding the first terminal 1 and undergoes reflections at different surfaces located in the environment 9, the acoustic echo signals 121 arriving at the microphone 102 consist of different fractions of the reflected acoustic wave, whereby each fraction shows an individual attenuation and an individual delay with regard to the original acoustic wave.

The echo signals 121 received by the microphone 102 are an unwanted constituent of the signals 121, 122, 123 received by the microphone 102. In order to prevent that the second subscriber 20 perceives an acoustic echo when listening to the signals from his loudspeaker 201, the far-end signal 21 stimulating the loudspeaker 101 is adapted by means of a filter to mimic the echo signal 121 as well as possible, and subtracted from the original near-end signal 12a created by the microphone 102 out of the acoustic and/or electric signals 121, 122, 123. In many cases, the filter is an adaptive FIR filter for modeling an echo path impulse response. The process steps of filtering and subtracting are conducted in the AEC 4.

Figure 2:
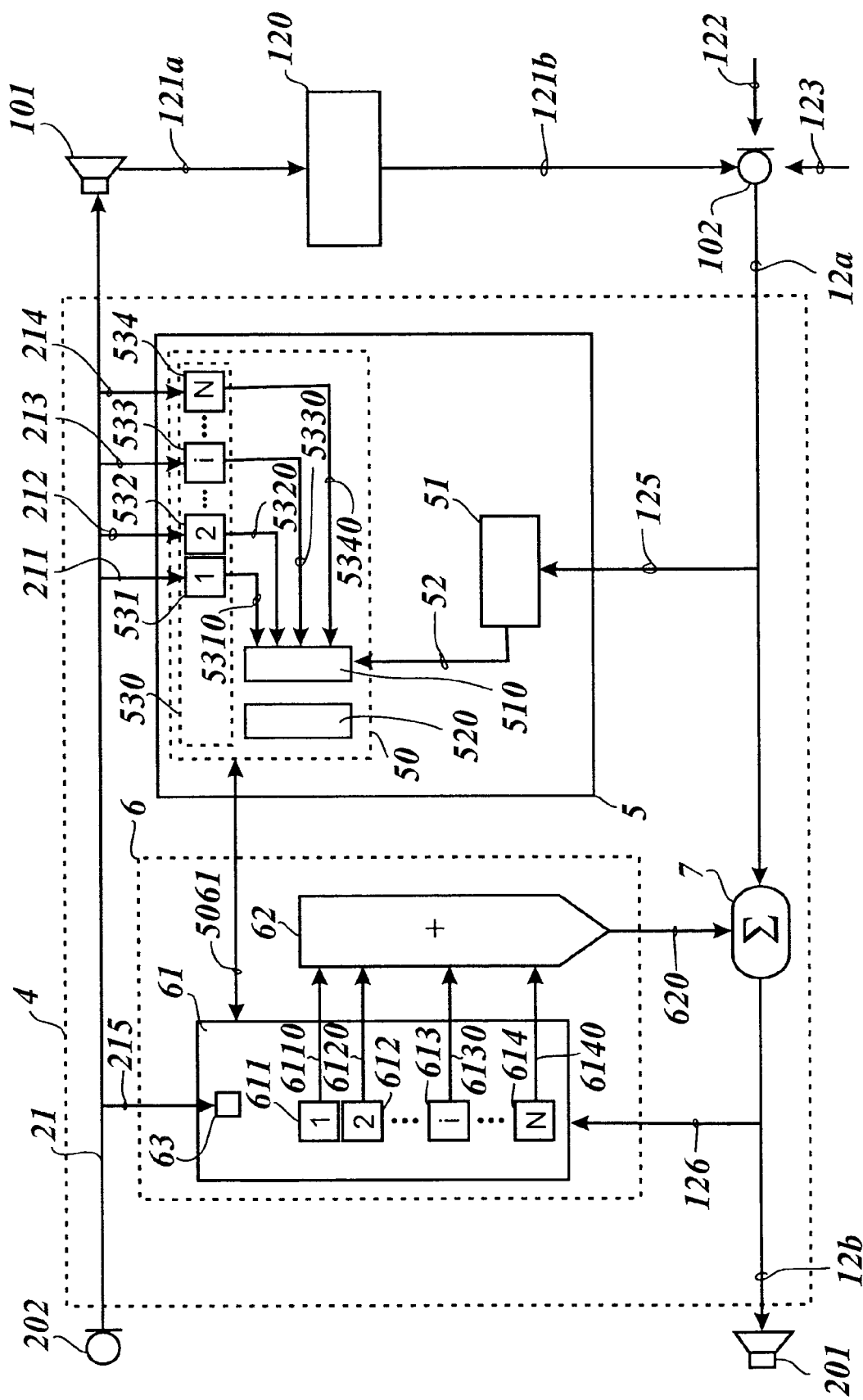
FIG. 2 is a block diagram of an AEC according to an embodiment of the invention message.

FIG. 2 is a block diagram showing the AEC 4. By means of the AEC 4, the original near-end signal 12a produced by the microphone 102 is modified dependent on the far-end signal 21 sent from the microphone 202 to the loudspeaker 101 as described with reference to FIG. 1. The acoustic waves 121a originating from the loudspeaker 101 are modified on account of echo effects 120 and arrive as echo signals 121b at the microphone 102, together with the acoustic voice signals 122 from the first subscriber 10 and the channel noise signals 123. The signals 121b, 122, 123 received and converted to the original electric signal 12a by the microphone 102, the echo signals 121b represent a constituent of the electric near-end signal 12a.

The AEC 4 comprises a DTD unit 5, a filtering unit 6, and a subtracting unit 7. The filtering unit 6 comprises a filter adaptation unit 61 and a summing unit 62. The filter adaptation unit 61 continuously receives a copy 215 of the far-end signal 21 and splits the received copy 215 by means of a splitter unit 63 in N equidistant segments. The N segments of the far-end signal 215 are modified by means of N corresponding filter segments 611 to 614 of the same segment size as the N equidistant segments of the far-end signal 215, resulting in filtered signals 6110, 6120, 6130, 6140. The filtered signals 6110, 6120, 6130, 6140 are recomposed in the summing unit 62 and sent as signal 620 to the subtracting unit 7. In the subtracting unit 7, the signal 620 is subtracted from the original near-end signal 12a, resulting in a residual near-end signal 12b. A copy of the residual near-end signal 12b is sent as feedback signal 126 to the filter adaptation unit 61 where the feedback signal 126 is utilised for the adaptation of the filter segments 611 to 614. Therefore, the filtering unit 6 represents a self-adapting system.

The DTD unit 5 comprises a controller 50 and a module 51 for determining the energy level of the original near-end signal 12a. The controller 50 comprises a calculator 510, a mediator 520 and an analyzer 530. A copy of the original near-end signal 12a is supplied as signal 125 to the module 51 where the energy level of the near-end signal 125 is determined. Likewise, copies of the far-end signal 21 are sent as signals 211 to 214 to the analyzer 530 and conducted to the modules 531 to 534. The modules 531 to 534 comprise delay circuits and units for determining the energy levels of the far-end signals 211 to 214.

The analyzer 530 divides the far-end signal 21 into N equidistant segments 211 to 214 with their size equivalent to the size of the filter segments 611 to 614. The first module 531 receives and holds a current sample of the far-end signal 21 of a temporal length equal to the temporal length of the equidistant filter segments 611 to 614. The second module 532 holds a sample of the far-end signal with a temporal delay equal to the temporal length of the far-end signal sample held by the first module 531. This way, every module 531 to 534 holds another sample of the far-end signal, such that the plurality of module 531 to 534 hold the past N samples 211 to 214 of the far-end signal 21.

The energy levels of the N segments 211 to 214 of the far-end signal 21 are determined and are sent as signals 5310, 5320, 5330, 5340 to the calculator 510. The calculator 510 calculates a ratio of the energy level 5330 of an i-th segment of the far-end signal 21 with a corresponding energy level 52 of the current sample 125 of the original near-end signal 12a and compares the calculated ratio with a threshold value which is defined by the controller 50 based on an hypothesis of a minimum echo path attenuation.

The results of the calculation in the calculator 510 is sent to the mediator 520. If the calculated ratio is higher than the threshold value, the mediator 520 enables the adaptation of the corresponding i-th filter segment 613 in the filter adaptation unit 61. On the other hand if the ratio is lower than or equal to the threshold value, the mediator 520 decides on double-talk and blocks the adaptation of the corresponding i-th filter segment 613 in the filter adaptation unit 61. The enabling signal and the blocking signals, respectively, are transmitted from the controller 50 to the filter adaptation unit 61 via a signal channel 5061.

Figure 3A:
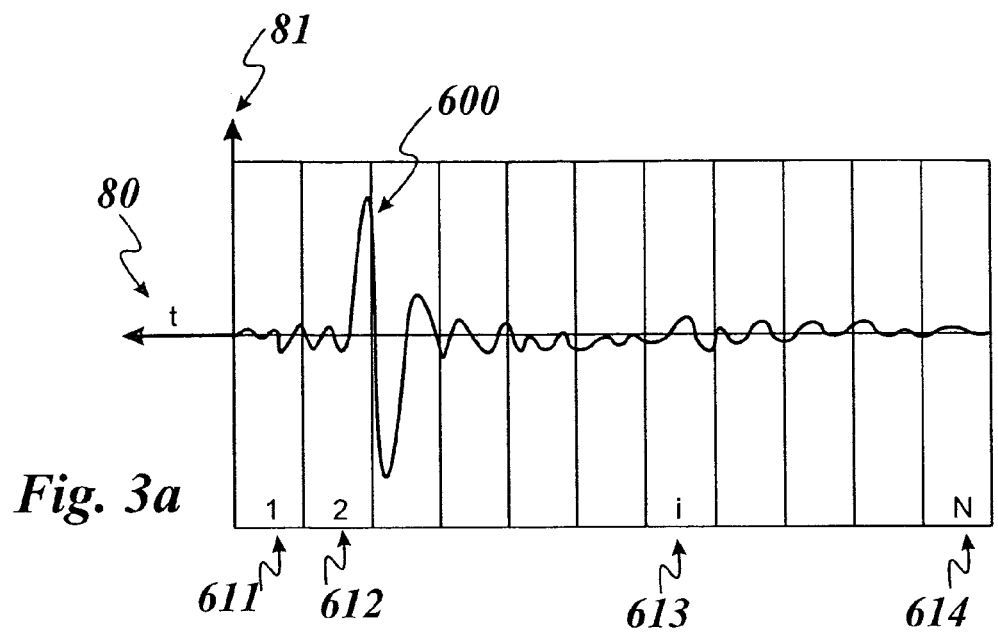
FIG. 3a is a diagram of an echo path estimate FIR filter according to an embodiment of the invention.

FIG. 3a shows an exemplary representation of an echo path estimate FIR filter where the amplitude of the filter signal 600 is plotted in arbitrary units 81 against time 80. The filter signal 600 is divided in the time domain in equidistant segments 611 to 614.

Figure 3B:
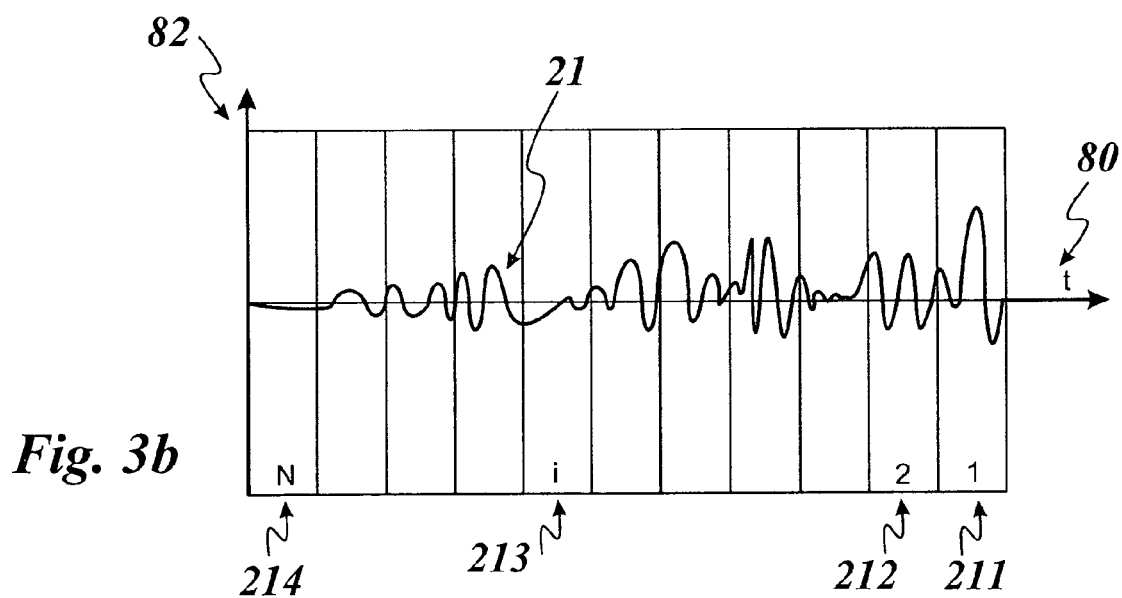
FIG. 3b is a diagram of a far-end signal according to an embodiment of the invention.

Corresponding to the diagram shown in FIG. 3a, FIG. 3b shows the past N samples of the far-end signal 21. The far-end signal 21 is plotted in arbitrary units 82 against time 80. The far-end signal 21 is divided in the time domain in N segments 211 to 214 which have the same temporal width as the segments 611 to 614 shown in FIG. 3a and for each of which the energy level is determined.

Figure 3C:
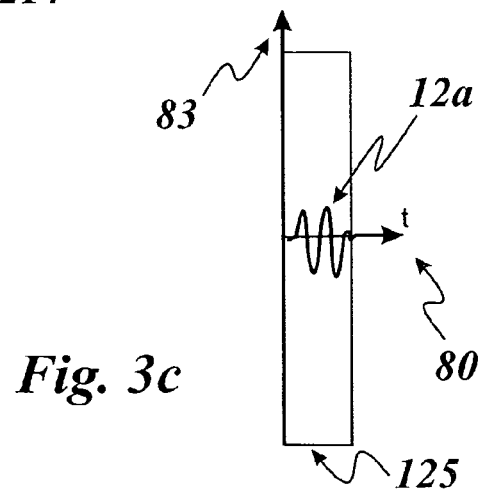
FIG. 3c is a diagram of a near-end signal according to an embodiment of the invention.

FIG. 3c shows a diagram of a current sample of the original near-end signal 12a which is plotted in arbitrary units 83 against time 80. The time domain width of the sample 125 has the same size as each of the segments 611 to 614 shown in FIG. 3a and each of the segments 211 to 214 shown in FIG. 3b. For each of the segments 211 to 214 of the far-end signal 21 and for the segment 125 of the original near-end signal 12a, the energy levels of the signals 21, 600 are determined. Then, the determined energy level of each segment 211 to 214 of the far-end signal 21 is compared with the energy level of the segment 125 of the original near-end signal 12a. This is done by calculating the ratio of the energy level of an i-th segment 213 of the far-end signal 21 with the energy level of the current sample 125 of the original near-end signal 12a. If the calculated ratio is higher than the threshold value, the corresponding i-th segment 613 of the filter is released for adaptation. Otherwise, if the ratio is lower than or equal to the threshold value, the adaptation of the i-th segment 613 of the filter is blocked against adaptation.

Figure 4:
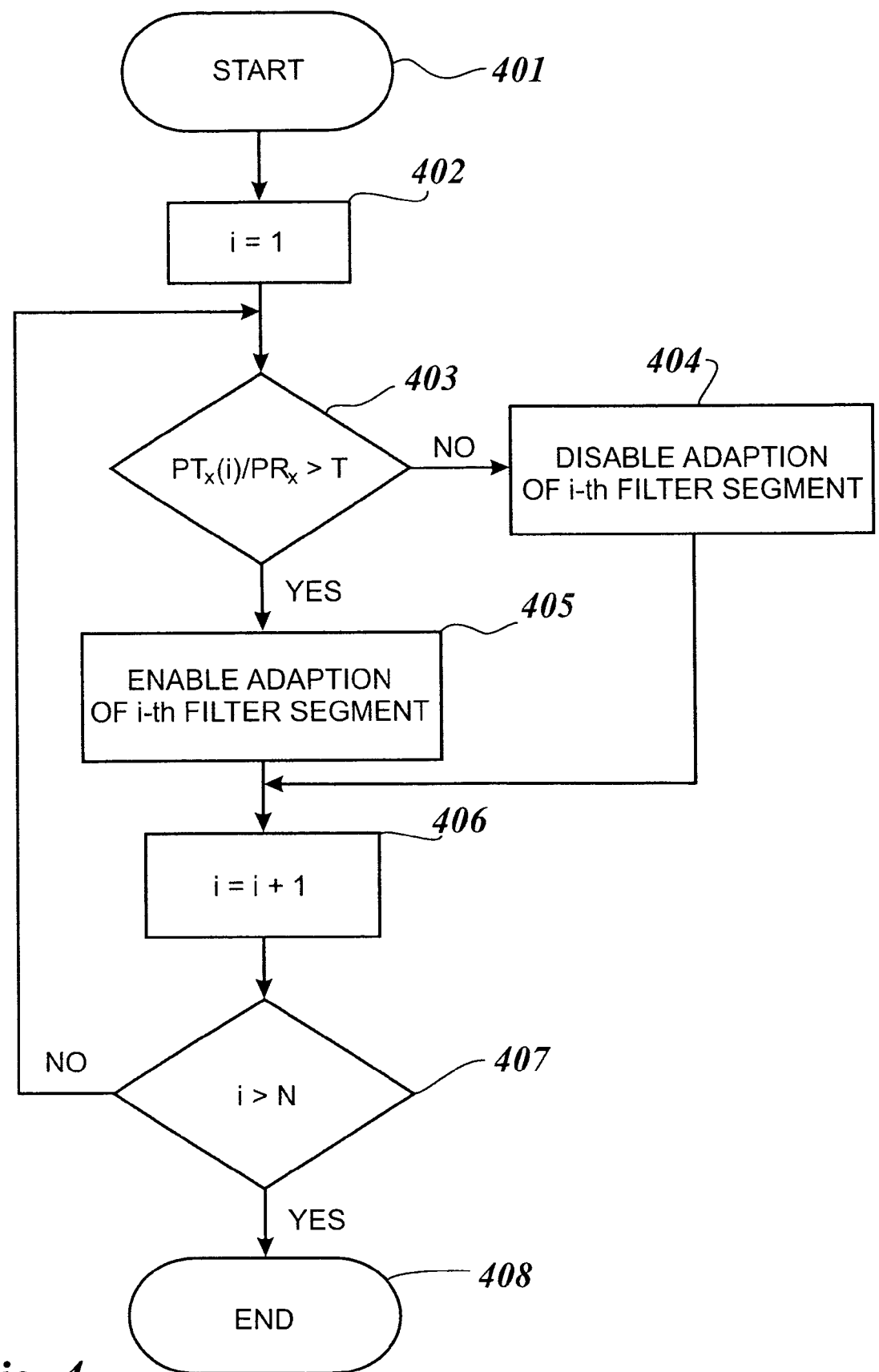
FIG. 4 is a message flow diagram showing processing steps of a controller according to an embodiment of the invention.

FIG. 4 shows a message flow diagram with processing steps 401 to 408 which are performed in the controller 50. After the start 401 of the program, a loop variable i is set to the initial value 1 in a first step 402. In a next step 403, the ratio of the energy level of the first segment of the far-end signal 21 and the energy level of the segment 125 of the original near-end signal 12a are calculated and compared to a threshold value T. If the comparison shows that the ratio is higher than the threshold value T, the first filter segment 611 is released for adaptation in step 405. On the other hand, if the calculated ratio is equal to or lower than the threshold value T, the adaptation of the first filter segment 611 is blocked in step 404.

In either case, the value of the loop variable i is increased by 1 in the next step 406. After increasing the value of the loop variable i to the next higher value, a check is performed in step 407 whether the current value of the loop variable i is higher than the total number of segments N. If this is not the case, the loop runs the same steps 403 to 407 for the current value of the loop value. In this manner, for all N segments 611 to 614 of the filter signal 600 a determination is made as whether to open an individual segment of the N filter segments 611 to 614 for adaptation by means of the filter adaptation unit 61 or not. If the loop steps 403 to 406 have been performed for the value of the loop variable i equal to N, the decision step 407 will be positive, and the message flow has reached the end 408.

The invention claimed is:

1. A method of controlling an adaptation of a filter, wherein the filter is an adaptive finite impulse response filter for modelling an echo path impulse response for echo cancellation in a telecommunications connection between a first terminal providing a near-end signal at a first end of the telecommunications connection and a second terminal providing a far-end signal at a second end of the telecommunications connection, comprising:

determining, in a multi-windowing scheme, a plurality of filter segments of the filter and a plurality of segments of the far-end signal in a time domain;

comparing an energy level associated with at least one of the plurality of segments of the far-end signal with an energy level associated to a sample of the near-end signal; and enabling the adaptation of at least one of the plurality of filter segments associated to the at least one of the plurality of segments of the far-end signal based on the comparing step.

2. The method of claim 1, further comprising:

generating the plurality of filter segments by dividing a time-domain representation of the filter into the plurality of filter segments;

generating the plurality segments of the far-end signal by extracting the plurality of samples of the far-end signal, each of the plurality of samples corresponding to one of the plurality of filter segments;

comparing an energy level of one of the plurality of segments of the far-end signal with a corresponding energy level of a current sample of the near-end signal; and enabling the adaptation of one of the plurality filter segments corresponding to the one of the plurality of segments in dependence on the result of the comparing step.

3. The method of claim 1, further comprising:

calculating, for comparison of said energy levels, a ratio of the energy level of one of the plurality of segments of the far-end signal and a corresponding energy level of a current sample of the near-end signal;

comparing said ratio with a threshold value;

enabling the adaptation of one of the plurality of filter segments corresponding to the one of the plurality of segments if the ratio is higher than the threshold value; and deciding on double-talk and blocking the adaptation of the one of the plurality of filter segments if the ratio is lower than or equal to the threshold value.

4. The method of claim 1, further comprising:

defining, for comparison of said energy levels, a threshold value on the basis of an hypothesis of a minimum echo path attenuation.

5. The method of claim 1, determining a plurality of subsequent and equidistant segments of the far-end signal, each of the plurality of segments corresponding to one of the plurality of filter segments.

6. The method of claim 1, further comprising:

determining a segment size of the far-end signal equal to a sample size of the near-end signal.

7. A controller for controlling an adaptation of a filter, wherein the filter is an adaptive finite impulse response filter for modelling an echo path impulse response for echo cancellation in a telecommunications connection between a first terminal providing a near-end signal at a first end of the telecommunications connection and a second terminal providing a far-end signal at a second end of the telecommunications connection, comprising:

a processor configured to determine, in a multi-windowing scheme, a plurality of filter segments of the filter and a plurality of segments of the far-end signal in the time domain, the processor being further configured to compare an energy level associated with at least one of the plurality of segments of the far-end signal with an energy level associated to a sample of the near-end signal, and the processor being further configured to enable the adaptation at least one of the plurality of filter segment associated to the at least one of the plurality of segments of the far-end signal based on the comparing step.

8. The controller of claim 7, wherein the processor is configured to operate in parallel to an existing double-talk detection unit, and to overrule an existing double-talk detection unit if the existing double-talk detection unit does not decide on double-talk and the processor decides on double-talk.

9. The controller of claim 7, wherein the processor is configured to receive data about the energy levels from existing double-talk detection units measuring said energy levels.

10. A non transitory computer program product for controlling an adaptation of a filter, wherein the filter is an adaptive finite impulse response filter for modelling an echo path impulse response for echo cancellation in a telecommunications connection between a first terminal providing a near-end signal at a first end of the telecommunications connection and a second terminal providing a far-end signal at another end of the telecommunications connection, wherein the non transitory computer program product, when executed by a controller, comprises:

determining, in a multi-windowing scheme, a plurality of filter segments of the filter and a plurality of segments of the far-end signal in a time domain;

comparing an energy level associated with at least one of the plurality of segments of the far-end signal with an energy level associated to a sample of the near-end signal; and enabling the adaptation of at least one of the plurality of filter segments associated to the at least one of the plurality of segments of the far-end signal based on the comparing step.

\* \* \* \* \*